United States Patent [19]
Acampora et al.

[11] Patent Number: 4,593,282
[45] Date of Patent: Jun. 3, 1986

[54] NETWORK PROTOCOL FOR INTEGRATING SYNCHRONOUS AND ASYNCHRONOUS TRAFFIC ON A COMMON SERIAL DATA BUS

[75] Inventors: Anthony Acampora, Freehold; Michael G. Hluchjy, Red Bank; Chan D. Tsao, Morganville, all of N.J.

[73] Assignee: AT&T Information Systems Inc., Holmdel, N.J.

[21] Appl. No.: 485,034

[22] Filed: Apr. 14, 1983

[51] Int. Cl.$^4$ .................................................. H04J 3/02
[52] U.S. Cl. ........................... 340/825.5; 340/825.51; 370/85; 370/79; 370/95
[58] Field of Search ....................... 340/825.05, 825.07, 340/825.14, 825.5, 825.51; 370/60, 94, 79, 85, 86, 89, 91, 95

[56] References Cited

U.S. PATENT DOCUMENTS

| | | | |
|---|---|---|---|
| 3,699,524 | 10/1972 | Norberg | 340/825.5 |
| 3,710,351 | 1/1973 | Nakamura | 340/172.5 |
| 3,796,992 | 3/1974 | Nakamura et al. | 340/147 LP |
| 4,295,122 | 10/1981 | Hatada et al. | 340/825.5 |
| 4,320,502 | 3/1982 | deVeer | 370/85 |
| 4,375,097 | 2/1983 | Ulug | 370/94 |
| 4,488,218 | 12/1984 | Grimes | 340/825.5 |

OTHER PUBLICATIONS

"An Introduction to Local Area Networks", Proc. IEEE, vol. 66, by D. D. Clark, K. T. Pogran, D. P. Reed, pp. 1497–1517.
"Local-Area Subnetworks: A Performance Comparison", IEEE Trans. on Comm., vol. COM-29, by W. Bux, pp. 1465–1473, Oct. 1981.
Computer Networks, Prentice Hall, 1981, Section 3.4.3, by A. S. Tanenbaum.

Primary Examiner—Donald J. Yusko
Assistant Examiner—Sharon L. Hodgkins
Attorney, Agent, or Firm—Barry H. Freedman

[57] ABSTRACT

Contention among a plurality of synchronous and asynchronous devices connected to a shared communication medium for access to time slots in a sequence of frames is resolved by assigning a unique priority word including a priority code prefix to each device and granting access to a given slot by comparing the values of the priority words assigned to competing devices. The priority code prefix is assigned as a joint function of whether synchronous or asynchronous communication is desired and whether synchronous communication is being initiated or continued. In each assignment protocol, synchronous communication is enabled by assuring any device that initially gains access to a particular time slot continued access to the same slot in succeeding frames. If desired, devices with synchronous access may relinquish unused time slots to asynchronous traffic, while reserving the ability to resume synchronous communication.

35 Claims, 15 Drawing Figures

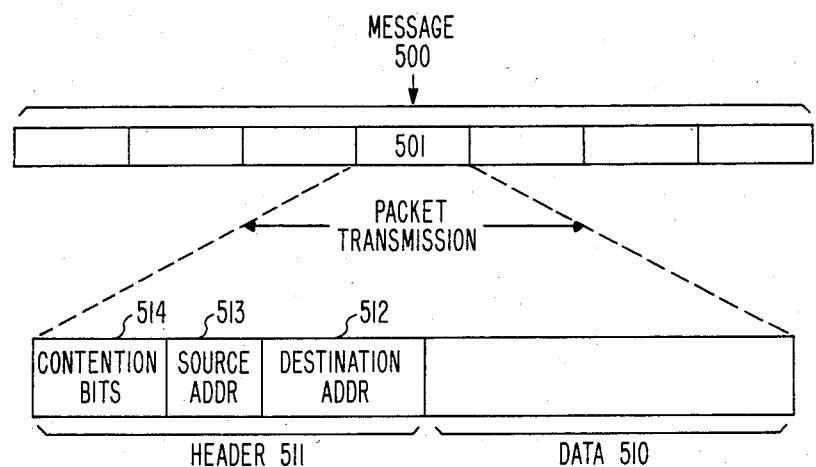
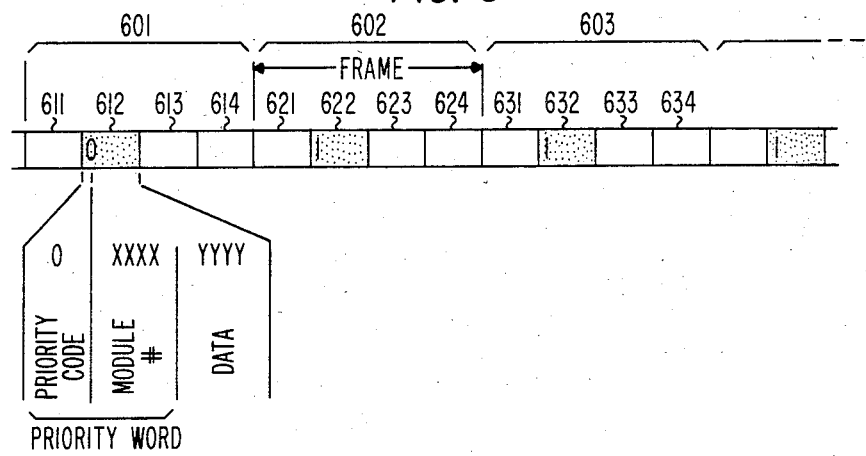
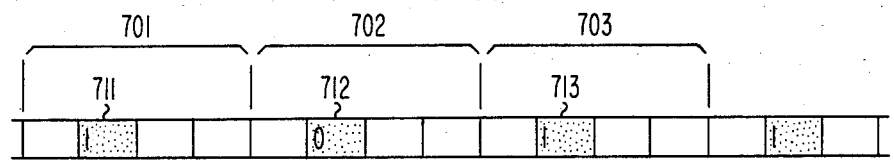

| PRIORITY CODES | | FUNCTION |
|---|---|---|
| | 111 | SYNCHRONOUS TRANSMISSION |
| ASYNCHRONOUS TRAFFIC | 110 | NETWORK CONTROL |
| | 101 | INTERACTIVE TRAFFIC |
| | 100 | |
| | 011 | NONINTERACTIVE TRAFFIC |
| | 010 | |
| | 001 | SYNCHRONOUS RESERVATION |
| | 000 | SYNCHRONOUS CONTENTION |

DISTRIBUTED SCHEME 1

DISTRIBUTED SCHEME 2

NETWORK PROTOCOL FOR INTEGRATING SYNCHRONOUS AND ASYNCHRONOUS TRAFFIC ON A COMMON SERIAL DATA BUS

FIELD OF THE INVENTION

The present invention relates generally to apparatus and a technique for transmitting data, voice and graphic information between a series of devices that are interconnected by a single communication network. In particular, the invention relates to a network protocol for integrating synchronous and asynchronous traffic on a common serial data bus which has applications to systems sometimes referred to as local area networks.

Local area networks (LANs) are data communication networks intended to provide high-bandwidth communication among a wide variety of data, voice and graphic information sources such as host computers, data terminals, facsimile scanners and telephones. Such networks are usually limited in geographic scope to an individual building or a campus, and rely on an inexpensive transmission medium to achieve high-bandwidth (1 to 100 Mb/s) communication between devices. Many people believe that LANs will provide the communications backbone for future office and factory automation.

Over the past decade, numerous architectures for LANs have been proposed, the most popular being the broadcast bus and the ring, with each type having many variations. A general description of known architectures is contained in D. D. Clark, K. T. Pogran, D. P. Reed, "An Introduction to Local Area Networks", *Proc. IEEE*, Vol. 66, pp. 1497-1517, November 1978, and C. Tropper, *Local Computer Network Technologies*, Academic Press, N.Y., 1981.

In both broadcast bus and ring architectures, it is known to "distribute" the electronics which provides the necessary interface between the various devices and the common transmission medium. For this purpose, a bus or ring interface unit is typically interposed between each device and the transmission medium, and this unit also functions to control access to the transmission medium and resolve contention disputes between the various devices connected to the network. Generally, the local area network transmission medium is time shared among the devices. In some cases time slots in a sequence of frames are allocated to particular devices based upon an assigned priority code. Information to be transmitted is packetized, each packet including source and destination address data as well as priority information. In this regard, it is sometimes desirable to assign a fixed high priority to certain types of devices, depending upon the nature of their output, their busy/idle status, or other factors. Alternatively, devices that have previously failed to gain control of a time slot can be given a temporary high priority to insure their subsequent access before other devices access the bus.

Because bus access protocols are important in enabling efficient and equitable allocation of limited communication network resources, much study and effort has gone into their design, both with respect to ring and bus architectures. Currently, the two most popular techniques, described in the Clark et al. and Tropper references cited above, are carried sense multiple access with collision detection (CSMA/CD) for bus systems and "token passing" for ring systems. Both schemes have been extensively analyzed and compared (see, for example, W. Bux, "Local-Area Subnetworks: A Performance Comparison", *IEEE Trans. on Comm.* Vol. COM-29, pp. 1465-1473, October 1981, and E. Arthurs et al., Traffic Handling Characteristics Committee Report, IEEE Project 802 on Local Area Network Standards, Working Draft, June 1982) and it has been found for CSMA/CD, that efficiency is degraded as bus length or transmission rate is increased or as message size is decreased. For token passing, it has been found that efficiency is reduced as ring latency is increased, which occurs when more interface units are added to the communication medium. Efficiency, in this context, includes consideration of throughput on the channel, the occurrence of collisions and channel idle conditions during busy periods, and other factors such as the overhead incurred in including priority and control information with the useful data that is to be transmitted between the devices connected to the bus.

In addition to the above factors, operation of a LAN is critically affected by the delay introduced in the transmission system between the origination and receipt of information, occasioned by the uncertainty of a device with information to be transmitted in actually gaining access to a given time slot. More specifically, if each terminal or device is assured access to time slots needed by that device, and the time interval between successive packets of information originating at a given device is fixed, then it appears that the transmission service provided between the various devices is synchronous. By way of comparison, if contention for the data bus by the various devices causes some packets of information to be delayed by different time periods, the resulting transmission service provided between the devices then becomes asynchronous. This can cause significant problems, particularly in digitized voice and facsimile transmission.

Several different techniques have been developed to smooth out the variations in interpacket arrival time, caused by the asynchronous nature of a contended data bus. The most common technique is to use a large buffer at the destination to delay the first packet of information by a fixed amount of time before transferring it to the receiving device. This smoothing technique guarantees synchronous transmission between two devices with some probability less than one; the probability can be made to approach one by increasing the delay of the first packet of information. However, an increase in this first packet delay time requires a corresponding increase in the destination buffer size. Additionally, buffering the entire message at the destination before transferring it to the receiving device is objectionable for real-time traffic, such as voice and interactive data, and also requires the destination buffer size to be application dependent.

Because of the time delay limitations inherent in the bus contention schemes described above, LAN systems have typically been limited to providing asynchronous service which meets the needs of computer communications. Synchronous service, required by voice and graphic communication, has not been amenable to implementation in a packet-switched local area network environment, and that service was thus limited to private line or circuit switched communication.

Accordingly, the broad object of the present invention is to provide a simple and efficient technique and apparatus for integrating synchronous and asynchronous traffic on a time-slotted priority contention data bus which interconnects a series of potentially diverse types of devices. In particular, it is the object of the present invention to provide a contention technique which gives priority to ongoing synchronous communication, which takes account of the differing requirements of each connected device, and which efficiently utilizes the communication resources provided by the local area network transmission medium.

SUMMARY OF THE INVENTION

The foregoing and additional objects are achieved in accordance with the principles of the present invention by an efficient bus contention mechanism which assigns a flexible priority word to each information packet originating at a device connected to a time-slotted priority contention data bus via an associated bus interface unit (BIU). The priority word has two parts, comprising one or more initial priority bits which define a priority code, followed by a binary number which is unique to each BIU. The second part of the priority word may, for example, be the address of the BIU, henceforth referred to as a module number. Time on the bus is divided into a series of consecutive frames each defined as a periodic interval containing an integral number of time slots, so that access to a given time slot in each frame constitutes a synchronous circuit. Contention for access to any time slot on the bus occurs on a bit-by-bit basis over both the priority code and the module number, such that the device with the "highest" priority word gains access.

In accordance with the present invention, priority code assignment depends upon (a) the nature of the communication desired (i.e., synchronous or asynchronous), and (b) when synchronous communication is desired, whether the device is initially contending for a time slot or is contending for a slot in order to continue an already established synchronous communication. For asynchronous communication, a priority code is assigned which can define different priority classes such that, for example, network control messages can be assigned a higher priority than interactive data messages which, in turn, can have a higher priority than long file transfers. Additionally, the priority bits can also be used to achieve a fair, round-robin like scheduling within a priority class. For synchronous communication, when a device initially seeks access to the bus, it is assigned a first, low priority code. When this device eventually gains access to a time slot and seeks to continue transmitting ongoing synchronous traffic in that slot in succeeding frames, a second, higher, priority code is assigned which guarantees successful contention.

In an illustrative embodiment, a one bit priority code is prefixed to the module number associated with each device, and this bit is always set at 0 for asynchronous transmissions and when a terminal initially desires to establish a synchronous circuit on the bus. When a terminal desiring to establish synchronous communication eventually wins contention, it transmits its first packet in the accessed time slot and continues transmission in the same slot in succeeding frames. However, here and until completion of its transmission, the priority bit is set at 1. This insures that the captured slot is available to the terminal in every succeeding frame, since the priority bit prevents any asynchronous or new synchronous transmissions (contending with 0 priority bit) from accessing the slot. Any ongoing synchronous transmission in that slot would have prevented the terminal from capturing the slot initially.

In other embodiments of the present invention, a multibit priority code is used, so that otherwise unused time slots in an established synchronous circuit can be captured by terminals wishing to insert asynchronous traffic on the bus.

By virtue of the unique arrangement of the present invention, both synchronous and asynchronous communication can be accommodated on the same time-slotted bus in an efficient and fair manner. The technique is compatible with known techniques for contention resolution, and can be implemented with a minimum of additional hardware, as compared to existing approaches.

BRIEF DESCRIPTION OF THE DRAWING

The features and advantages of the present invention will be fully understood by reference to the following detailed description when read in light of the accompanying drawing in which:

FIG. 5 is an illustration of the elements of a packet transmitted on the bus of FIG. 1;

FIG. 6 illustrates a one-bit priority code protocol in accordance with the present invention;

FIG. 7 illustrates the possibility of simultaneous contention by two ongoing synchronous circuits using the protocol of FIG. 6 where one device requires a particular time slot in every other frame;

DETAILED DESCRIPTION

Figure 1:
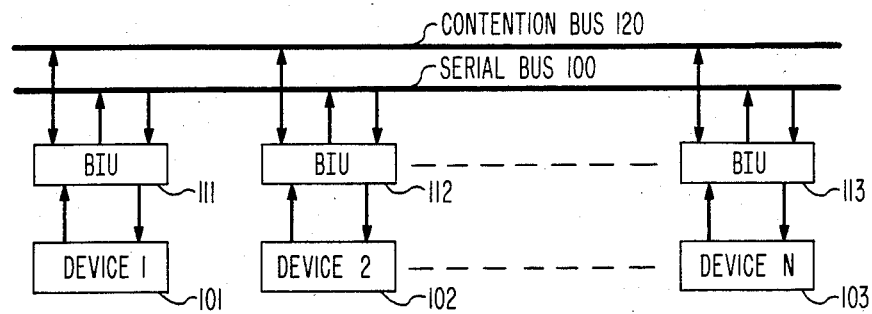
FIG. 1 is a block diagram illustrating the interconnection of several devices to a serial communication bus via corresponding bus interface units.

Referring now to FIG. 1, there is shown a simplified diagram illustrating the connection of several terminal devices to a serial communication bus. Devices 101–103 may be computer terminals, telephone sets, graphic input devices, or any other devices arranged to generate and/or receive information on a synchronous or asynchronous basis. Each device 101–103 is interconnected to a serial bus 100 via a corresponding bus interface unit (BIU)111–113, which is arranged to appropriately format information destined for and generated in each device. Although not shown in FIG. 1, a BIU can be arranged to act as an interface for several devices, using known time division techniques. In some implementations, bus 100 carries both data and contention information, while in other arrangements, a separate contention bus 120 is provided, and each BIU is connected to both busses. For the purposes of the following description, it is assumed that a single bus is provided, but the present invention can advantageously be used in either configuration.

As shown in FIG. 1, BIUs 111–113, as explained fully below, are arranged to format outbound information by dividing it into fixed length packets and by adding a suitable header which includes bus contention information. The BIUs also strip unnecessary information from incoming packets before applying message data to the associated device. Bus 100 is a serial, time-slotted high speed communication medium which may be implemented by a wired OR bus. The characteristics and required performance criteria for a suitable bus are well known, and are described, for example, in VME *Bus Specification Manual*, Motorola, Rev. A, October 1981.

Figure 2:
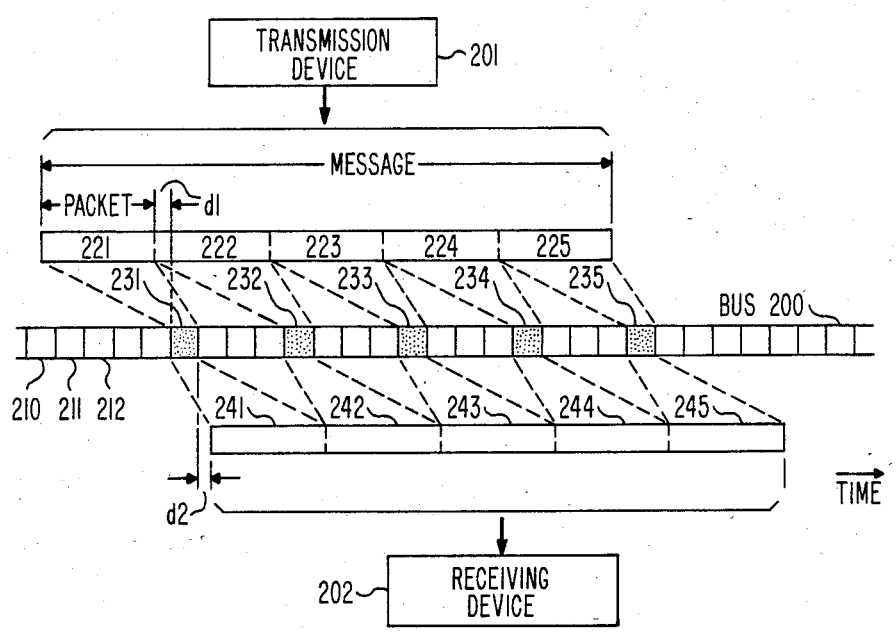
FIG. 2 is an illustration showing the transmission of a synchronous message on a time-slotted uncontended bus.

FIG. 2 illustrates how a time slotted communication bus, such as bus 100, can be used to provide synchronous communication between a pair of terminal devices when access to an uncontended bus is assured. Time on the bus is shown as a series of consecutive time slots such as slots 210–212 each of which may be filled with information originating in a transmitting device 201 and destined for a receiving device 202. The output of device 201 is a message comprising a series of packets 221–225 which occur at a regular rate. When the initial packet 221 has been assembled, it is entered in the next available time slot 231, after a small delay d1 needed for the assembly process. Receiving device 202 (or, more precisely, its associated BIU) monitors the bus, and extracts the information in time slot 231, again after a small processing delay d2. The format of the received information is suitably modified to regenerate packet 241.

The same procedure is followed for succeediing packets 222–225 generated in device 201, which are transmitted in regularly spaced time slots 232–235, respectively. Each received packet is delayed by the same interval d2, so that the logic required in the interface units 111–113 of FIG. 1 can be quite simple.

Figure 3:
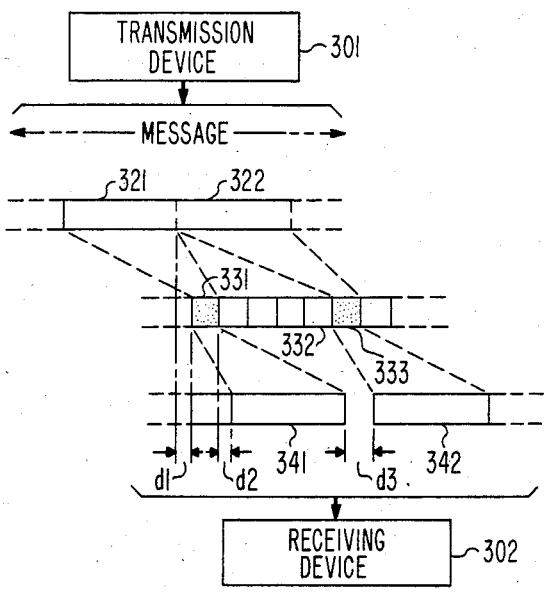
FIG. 3 illustrates the description which may occur in synchronous transmission on the bus of FIG. 2 due to failure of a device to gain access to a desired time-slot during contention.

When contention for time slots on bus 100 is necessary, the synchronous operation shown in FIG. 2 is disrupted. For example, as shown in FIG. 3, packet 321 may be inserted in time slot 331 after an assembly delay d1 and recovered as packet 341 after a processing delay d2. The next packet 322, intended for insertion in time slot 332, may lose the bus contention for this slot. In this event, the next available slot 333 may be used; the recovered packet 342 is then not available at the receiving device until a time interval d3 after the end of packet 341, causing the received sequence to lose synchronization. The amount of delay depends upon the number of attempts that the transmitting device must make before gaining access to an available time slot.

Figure 4:
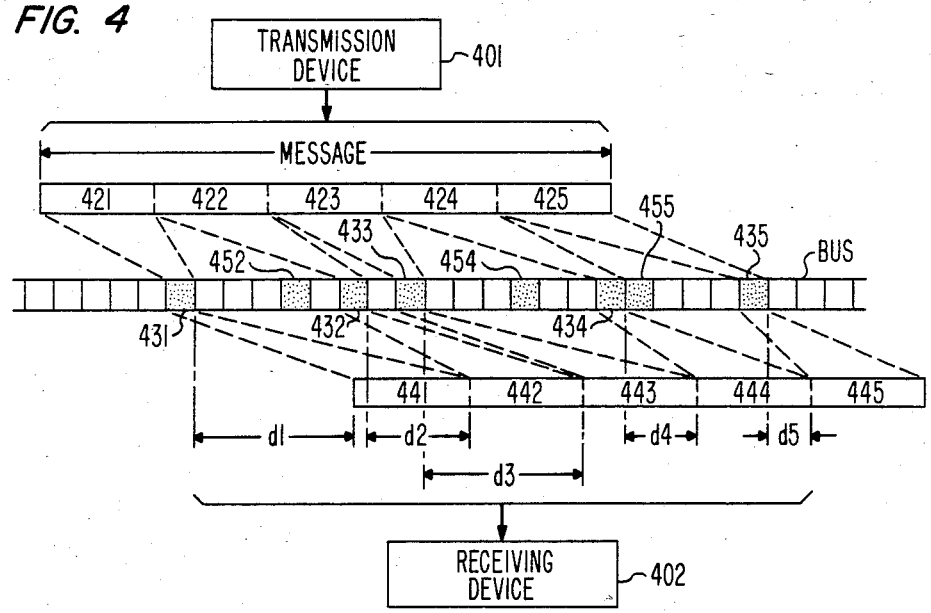
FIG. 4 illustrates the manner in which synchronous transmission may be achieved on a contended time-slotted bus using a receive buffer.

One prior art technique used to alleviate the difficulty just described is to introduce a variable delay ino the interface unit associated with each receiving device on the bus, so that gaps between successive packets can be avoided. This is usually done by adding a first-in-first-out buffer to the receiver portion of the bus interface unit, so that information arriving asynchronously can be read out in at regular (synchronous) rate. The effect of this technique is illustrated in FIG. 4. Packet 421, originating in transmitting device 401, is inserted in time slot 431, after a small assembly interval. Upon reception in the interface unit associated with receiving device 402, this packet is delayed in the buffer by a predetermined delay time interval d1 before being applied to the receiving device as packet 441. The next originating packet 422, normally destined for insertion in time slot 452, may, for example, be delayed for two time slots, due to failure of the associated transmitting device to gain bus access when desired. This packet is ultimately placed in slot 432. To insure that information is synchronously received at device 402, this packet must be delayed for an appropriate period d2 in the interface unit before being applied to the receiving device as packet 442. The interval d2 is shorter than the predetermined delay d1 by an amount corresponding to the delay in gaining bus access.

Packet 423, inserted in time slot 433 (next available after assembly) is also delayed in the receiver buffer, but by a period d3 corresponding the predetermined delay d1.

Inspection of the example of FIG. 4 shows that packets 424 and 425, which ordinarily would be transmitted in time slots 454 and 455, respectively, may each be unable to gain access for several slots. They are eventually transmitted in slots 434 and 435, respectively. As a result, arriving packet 443 is delayed for an interval d4 while packet 445 is delayed for a smaller interval d5. If any succeeding packets are unable to gain access for a time period longer than the maximum delay interval d1 provided by the receive buffer, a gap in received packets will destroy the synchronous nature of the received information.

To appreciate the manner in which synchronous communication is enabled in accordance with the present invention, it is helpful to better understand the contention mechanism normally used when a device seeks access to a time slot on a contended communication bus, and the arrangement of the packets which make up the messages being transmitted on the bus. As shown in FIG. 5, a typical packet 501 in message 500 includes a data portion 510 and a header portion 511 which is positoned before the data. The data portion, which may vary in length from packet to packet, can itself include several fields; different arrangements for the data portion of each packet are well known to those skilled in the art, and form no part of the present invention.

Header portion 511, as shown in FIG. 5, includes destination and source address information 512 and 513, respectively, and contention bits 514 which are used to determine which device may access the bus at any given time. In some implementations, part or all of the source address may be included in the contention bits. It is the organization and effect of this contention information which is of most concern in the present invention, and which will be described more fully below.

Generally speaking, contention information 514 associated with each packet 501 is numerical information (sometimes hereinafter called a "priority word") which determines the relative priority of each device connected to the bus with respect to the other connected devices. Such information may be fixed or variable, but at any time that two or more devices are in active contention, the respective priority word values are compared to determine the successful contender. It is required that no two devices use the same priority word simultaneously. One contention resolution scheme, described in U.S. Pat. No. 3,710,351, issued to H. Nakamura on Jan. 9, 1973, is based on the assumption that each device connected to the bus can simultaneously transmit and receive, with the bus functioning as a logical OR gate. This characteristic is present in open collector bus drivers where the conducting state (0 volts=logical 1) has dominance over the nonconducting state (+3 volts+logical 0). The devices are bit synchronized, so that each device will maintain synchrony with respect to bit transmissions and receptions.

In order to resolve contention at the beginning of a particular time slot on the bus, each device seeking to place a packet on the bus begins transmitting its priority word, most significant bit first. Concurrently, each device reads the bus. After each bit in the priority word is transmitted on the bus, the devices each determine if what they transmitted differs from what was received; if so, that device stops contending, since a device with a higher priority word is involved in the competition. The contention process proceeds with a yielding device refraining from further transmission of its priority word if a 0 is transmitted and a 1 received. At the end of the priority word transmission, the contending device with the highest priority word wins the contention for the time slot in question, and continues to transmit the remainder of its packet without interference. During the next time slot, the contention procedure is repeated.

Contention based on each device using a unique fixed priority word value, as described above, results in an unfair allocation of bus resources, since, under heavy loading, packets originating in devices with high prioriy worrds will incur considerably smaller delay than those from devices with low values. To avoid this unfairness, a group contention scheme has been devised whereby one priority bit is prefixed to the fixed information used in forming priority words. Unlike the fixed information (which can, for example, be a unique BIU identification number) the priority bit can change with time, and two or more BIUs may use the same priority bit simultaneously. In this arrangement, bus contention occurs over the entire priority word, including both the priority bit and the fixed information; after the priority bit has been transmitted, only those contending modules with the highest priority continue to contend using the fixed information. In this group contention scheme, a device initially contending for the bus has its priority bit set at 0. If it loses contention because another contending device had this bit set at 1, it continues to contend with its priority bit set at 0. If it loses contention and the winner had this bit set at 0, it contends in the next, and all subsequent slots until it wins, with its priority bit set at 1. Whenever a device wins contention, it priority bit is reset, if necessary, to 0 before contending again.

With the group contention scheme, cycles appear on the bus for which all slots but the first contain packets with the priority bit equal to 1. In effect, each device wishing to insert a packet on the bus is given the opportunity to transmit one packet in each such cycle, with the proviso that a device must wait until the next cycle before it can insert newly generated information on the bus.

In spite of the advantages obtainable using the group contention scheme just described, access to the bus is nevertheless asynchronous, because the contention process may cause packets from the same device to be delayed by varying amounts before transmission. Communications such as PCM voice which require real-time synchronous transmission of data where both the bandwidth and delay of the channel are fixed, are thus not amenable to implementation in a LAN environment using such techniques.

In accordance with the present invention, a technique and corresponding apparatus assures that once a device desiring a synchronous circuit gains access to a particular time slot on the bus, it will thereafter be able to insert its packets in the same time slot in succeeding frames, until it desires to relinquish its access. Establishment of such synchronous circuits is achieved by a unique protocol which adds one or more bits forming a priority code to the other contention information in the priority words assigned to each device. Priority code assignment is controlled by the bus interface unit associated with each device connected to the bus.

In a first illustrative embodiment, the priority code is a single bit prefixed to a (generally fixed) unique module number associated with each BIU. The priority bit is always set to 0 for asynchronous traffic. When a device wishing to establish a synchronous circuit first contends for the bus, its priority bit is set at 0. When the device eventually wins contention, it transmits its first packet and then continues the transmission in the same time slot one frame later. Here, and until the completion of its transmission, the priority bit is set at 1. To relinquish its synchronous circuit, the device simply stops transmitting.

The use of a one bit priority code which takes account of the synchronous/asynchronous nature of the communication and its initial/continuing status is illustrated in FIG. 6, in which time on a common bus is divided into a series of frames 601–603 each including, for example, four time slots 611–614, 621–624, and 631–634, respectively. When devices not yet communicating initially contend for time slots in frame 601, the one bit priority code in the priority word associated with such devices is set at 0; the device that will gain access to the bus and transmit its packet in its newly captured slot (e.g., slot 612) will depend upon the evaluation of the remainder of the priority word, usually just the module number. In succeeding frames 602, 603, the device that gained access to a particular slot (e.g., the second time slot in FIG. 6) will continue to contend for that slot (e.g., slots 622,632) but with its priority bit set at 1. This protocol insures that any device seeking a synchronous circuit that initially gained access to the bus will be successful, since the priority bit set at 1 in frames 602 and succeeding frames prevents any asynchronous or new synchronous transmissions (contending with priority bit set at 0) from accessing the slot. Note that any ongoing synchronous transmission in slot 612 would have prevented a device from initially capturing that slot.

While the contention protocal just described guarantees a "winning" device continued synchronous access to a captured time slot on a contended bus, an inefficiency can arise if the winning device generates packets for transmission at a rate which is a fraction of the bus frame rate. For example, if frames occur at a rate such that one time slot per frame constitutes a 64 kb/s synchronous circuit, a device transmitting synchronously at 32 kb/s would require a time slot in only every other frame. As shown in FIG. 7, this could lead either to wasted slots, or contention by two devices with ongoing synchronous communication. Specifically, access to time slot 711 in frame 701 may have been acquired in a previous frame by a device requiring a 32 kb/s circuit. In frame 702, the corresponding time slot 712 is thus available, and this slot may be accessed by a second device requiring a 64 kb/s circuit. As a result, both devices will have their priority bit set at 1 when they contend for time slot 713 in the frame 703, causing the one with the lower module number to yield the bus to the other. Alternatively, the device acquiring slot 711 initially can be arranged to make corresponding slots 712 and 713 in succeeding frames 702 and 703 unavailable to other devices on the bus, whether or not the slots are actually needed or used, simply by inserting a priority bit set at 1 in these unused slots. This solution avoids interference but increases inefficiency.

To avoid the problem illustrated in FIG. 7, and to make time slots unused by devices with ongoing synchronous circuits available for asynchronous traffic, a priority code including two priority bits may be used in conjunction with the BIU dependent contention information to form the priority word for each device. With this arrangement, when a device wishes to initially establish a synchronous circuit, it contends for a bus time slot with its two priority bits set at 00. After eventually winning a slot, the same slot is reserved for its use in the next frame and every frame thereafter, until the device chooses to relinquish control of the slot, by allowing the device to contend with a priority code of either 11 or 01. When the device wishes to actually use the reserved time slot, it sets its two priority bits to 11; when it does not need the slot in a given frame, but prefers to keep the synchronous circuit for later use, it sets the priority bits to 01 and contends for the slot only during the two priority bits. In this scheme, devices desiring asynchronous transmission have priority bits set at 10.

From the above description, it is to be noted that the priority code 11 given to ongoing synchronous transmission prevents any other device from accessing a captured slot except at the "pleasure" of the device that has reserved it. The priority code 01 assigned to devices with ongoing synchronous circuits allows asynchronous packets (with priority code 10) to use a slot "given up" by the reserving device, but prevents new synchronous transmissions (with priority code 00) from capturing the slot.

Figures 8, 9:
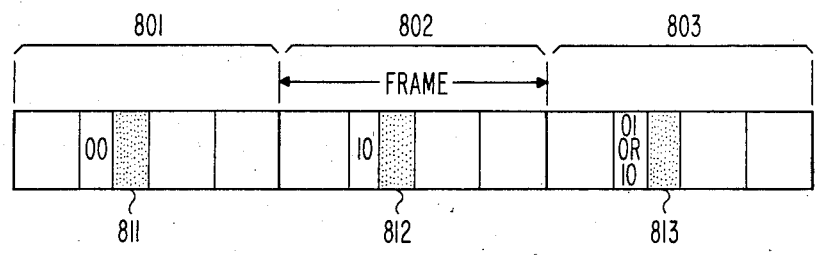
FIG. 8 illustrates a two-bit priority code protocol in accordance with the present invention which provides synchronous and asynchronous transmission on a contended time-slotted bus.
FIG. 9 illustrates a three-bit priority code protocol which has the advantages of the protocol shown in FIG. 8 and which also allows creation of different classes of priority for asynchronous traffic and group contention within each class.

The two bit priority code protocol in accordance with the present invention is illustrated in FIG. 8. In a first frame 801, devices not yet transmitting data on the bus initially contend for unused time slot 811 with priority bits set at 00, if synchronous communication is desired, and with 10 priority code for asynchronous communication. This arrangement will allow asynchronous circuits to have priority over synchronous circuits seeking initial access. A winning device seeking synchronous communication is guaranteed access to corresponding slots 812 and 813 in succeeding frames 802 and 803, respectively, because it can set priority bits to 11 (frame 802) to actually insert a packet on the bus or to 01 (frame 803) when synchronous transmission is temporarily stopped but the slot is reserved for later use. With the 01 priority code in effect, slot 813 may be accessed by a device wishing to communicate asynchronously, but not by another device wishing a new synchronous circuit.

By assigning asynchronous communication a code of 10, which is higher than the code 00 assigned to devices seeking initial synchronous communication, several advantages are realized. First, a device which has established a synchronous circuit can relinquish unused slots to devices seeking asynchronous communication. This follows because the code (10) for asynchronous communication is higher than the code (01) used to relinquish time slots. Of course, the reserved slots with code 01 cannot be accessed by devices seeking initial synchronous circuits with priority code 00. Second, it is advantageous to give asynchronous communication priority over devices initially seeking synchronous circuits. This is because it is generally less harmful to delay initial synchronous communication than it is to allow a large backlog of buffered asynchronous packets.

The two bit priority code protocols just described can be further extended to allow a single time slot per frame to be shared by $n \geq 2$ synchronous circuits, each requiring only one time slot in every n frames, where n is selected from a set of $2^b$-1 integers and b is a selected system parameter. In this extension, the two bit priority code described above, is preceded by a b bit identification code which is not used to resolve bus contention, but rather is used only to identify the frame periodicity (n) associated with each synchronous circuit. Initially, the b identification code bits are set to zero; when a device requiring a synchronous circuit (with periodicity $n \geq 2$) captures a time slot, the b identification code bits that specify its desired synchronous transmission rate are transmitted in the first b bits of this captured slot in each and every frame for as long as the device maintains its synchronous circuits. Every $n^{th}$ frame the device has its two priority bits set to 11 (or 01 if it choses to make its slot available to asynchronous traffic). For the remaining n-1 out of n frames, the device does not contend for the slot, and these time slots may be contended for by other devices requiring synchronous circuits. However, as specified by the b identification code bits, only devices requiring a synchronous circuit with a periodicity of n frames are allowed to contend for these time slots. Other devices which are successful in establishing synchronous circuits in the same slot also transmit the b identification bits in every frame. (Two or more devices transmitting the same b-bit identification code in the same slot do not cause any problems, since the bus acts like a wired OR gate.) Therefore, as additional devices using this time slot for synchronous communication are added and removed, the synchronous transmission rate identification remains intact as long as synchronous transmission from at least one device remains active in the slot.

In order to assign priority codes that accommodate both synchronous and asynchronous traffic as just described, and to concurrently provide multiple prioriy classes for devices that may be connected to the bus, a priority code consisting of three priority bits may be used, as illustrated in FIG. 9. With this protocol, ongoing synchronous transmission assumes the highest priority code (111), while synchronous contention (i.e., for establishing a synchronous circuit) and synchronous reservation (i.e., for freeing unused slots to asynchronous traffic) occupy the two lowest priority codes (000 and 001, respectively). The five remaining codes are used by asynchronous traffic, and include three priority classes: the lower two classes signified by priority codes 10X and 01X each themselves have a least significant bit (X) which can be varied in accordance with the group contention scheme described above, with the 10X code being used, for example, by interactive traffic and the 01X code being assigned to non-interactive traffic. With this scheme, the third priority class (110) can be used for higher priority information, such as network control signals.

An alternative 3 bit priority code arrangement can be used in which the k lowest priority codes (i.e., 000, 001 and 010 when $k=3$) can be used to predetermine priorities between devices which are seeking to initially establish synchronous communication on the bus. With this arrangement, the next higher code (011) would then be used to allow devices which have gained access to a synchronous circuit to relinquish unused time slots to asynchronous traffic. As before, a priority code higher (i.e., 111) than all remaining asynchronous codes (100, 101, 110) would be reserved for synchronous transmission on established synchronous circuits.

If desired, additional bits can be used for priority codes, in order to establish still other priority classes among the digital terminal equipment connected to the bus. This adds to system overhead, but adds flexibility, which is sometimes more desirable. In general, if n priority bits are used, $2^n-3$ priority codes are available for asynchronous traffic; where group contention is desired, each priority class must be allotted two priority codes. The remaining three priority codes are used, as described above, for initial synchronous contention, ongoing synchronous transmission and synchronous reservation.

If it is desired to give devices contending for initial synchronous access to the communication medium equal or greater priority than the devices contending for asynchronous access, and yet retain the ability of a device engaged in synchronous transmission to relinquish unused time slots to asynchronous traffic, the two-bit priority code described above can be modified, as set forth below, provided that the contention procedure followed by asynchronous devices is also modified. In particular, if devices engaged in asynchronous contention are arranged to suppress or ignore the outcome when the first priority code bit is evaluated (and begin evaluation for the second priority code bit), the priority code assignment shown in Table 1 may be used. The ability to ignore evaluation of the initial priority code can be accomplished by delaying the start signal applied to the contention logic shown in FIG. 14, described below, for one-bit interval.

TABLE 1

| Contention for: | Priority Code: |
|---|---|
| 1 Continued Synchronous Access | 11 |
| 2 Reservation of Synchronous Access | 10 |
| 3 Initial Synchronous Access | 01 |
| 4 Asynchronous Access | 00 |

With this arrangement, initial synchronous access has priority over asynchronous access, since the second bit in priority code 01 is higher than the second bit in code 00. However, when a time slot has been reserved for later synchronous access with priority code 10, one or more devices seeking asynchronous access will ignore the first bit contention results and begin to contend with the second priority code bit (0). As explained previously, the reserving device discontinues contention after its two-bit priority code has been applied to the bus, while one or more asynchronous devices continue contention; the device with the highest priority word eventually gains access, as desired. By modifying the priority code assigned to devices seeking synchronous contention from 01 to 00, but otherwise maintaining the procedure described above, initial access to time slots for both synchronous and asynchronous communication is made equal.

Figure 10:
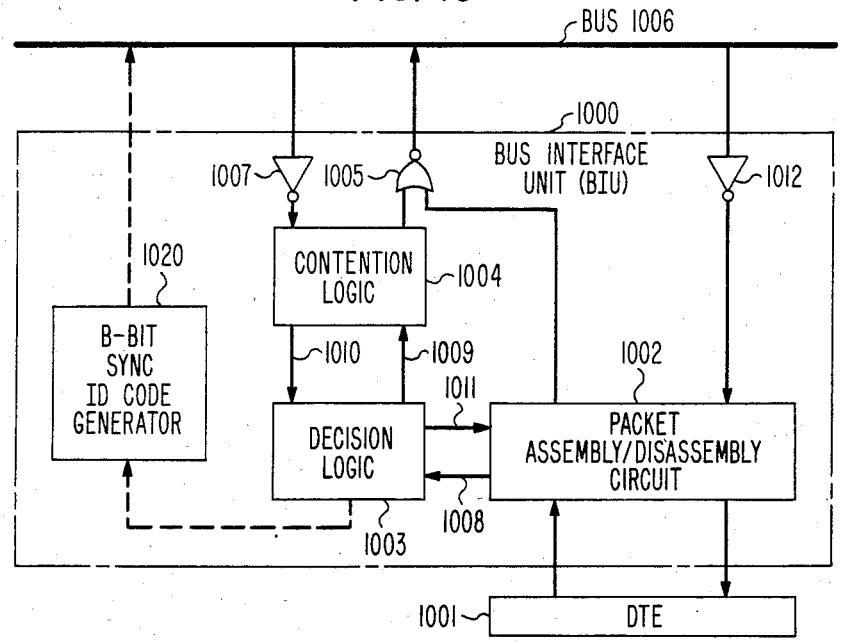
FIG. 10 is a block diagram of a bus interface unit which can implement the priority code protocols of the present invention.

FIG. 10 is a block diagram of bus interface unit 1000 which interconnects digital terminal equipment (DTE) 1001 to a time slotted bus 1006. As stated previously, one major function served by interface unit 1000, which corresponds to BIUs 101-103 of FIG. 1, is contention resolution for accessing time slots on the bus. Another BIU function is assembly of packets which include header information and data originating in DTE 1001 and intended for insertion in a time slot on bus 1006, and disassembly of incoming data. Assembly and disassembly performed in circuit 1002, is required in all packet-switching network architectures, and has been described extensively in the literature. A summary of the operations performed in circuit 1002, the details of which form no part of the present invention, is contained in A. S. Tanenbaum, *Computer Networks,* Prentice Hall, 1981, Section 3.4.3; examples of packet assembler/disassembler circuits can be found in commercially available systems known as DECNET (by Digital Equipment Corp.), SNA (by IBM), Ethernet (by Xerox), LocalNet (by Sytek) and Net/One (by Ungermann-Bass), the last three systems being local area networks.

When a packet has been assembled, circuit 1002 couples a packet ready indication (via line 1008) to decision logic 1003, indicating that a time slot for transmitting the packet on bus 1006 is desired. Concurrently, information describing the type of communication desired (e.g., asynchronous or synchronous) is also applied to logic 1003.

Depending upon the particular protocol selected, decision logic 1003, which may be a finite state logic machine, described in more detail below, then couples a control signal (via line 1009) to contention logic 1004, indicating the appropriate priority code to be prefixed to the (generally fixed) unique contention information (e.g., module number) resident within logic 1004 that distinguishes BIU 1000 from other BIU's connected to bus 1006. At the beginning of the next time slot, the priority bits and the remaining contention information that comprise the priority word 514 of FIG. 5 are coupled to bus 1006 via NOR gate 1005, one bit at a time, with the most significant bit first. As described previously, bus 1006 acts as an OR gate, so that (for negative logic) the bus is voltage low when the output of any connected BIU is low. The bus state is monitored by contention logic 1004 via an input received via inverter 1007. Logic 1004 is arranged such that a difference between the applied priority word and the received contention information results in a termination of the attempt to access the current time slot. On the other hand, successful access is indicated when the entire priority word applied via gate 1005 is identical to the information received by logic 1004 via inverter 1007.

When access to a time slot has been obtained, contention logic 1004 signals decision logic 1003 and packet assembly/disassembly circuit 1002 via lines 1010 and 1011 so that the packet assembled in circuit 1002 may enter the acquired slot via NOR gate 1005. If succeeding packets generated by DTE 1001 are part of the same synchronous message, they likewise are assembled in circuit 1002 and applied to bus 1006 via gate 1005. However, for these packets, decision logic 1003 is arranged to insert the appropriate (but different) priority code, in accordance with the selected protocol described above, so that contention logic 1004 will be assured of gaining access to slots needed for synchronous communication. When all of the packets in a message have been processed, an end of message signal is extended from packet assembly/disassembly circuit 1002 to decision logic 1003, via line 1008.

Packet assembly/disassembly circuit 1002 also monitors bus 1006 via an input from inverter 1012 to extract packets destined for DTE 1001 associated with BIU 1000. The extraction process is well known to those skilled in the art. Numerous techniques have been used for this purpose.

Also shown in FIG. 10 is an optional code generator 1020 which can be used when it is desired to generate the b-bit synchronous transmission rate identification code described above, under control of decision logic 1003. According to the synchronous communication rate desired by DTE 1001, the appropriate b-bit code is loaded into a shift register within code generator 1020. Under control of decision logic 1003, this code is clocked out onto the bus at the appropriate times.

Figure 11:
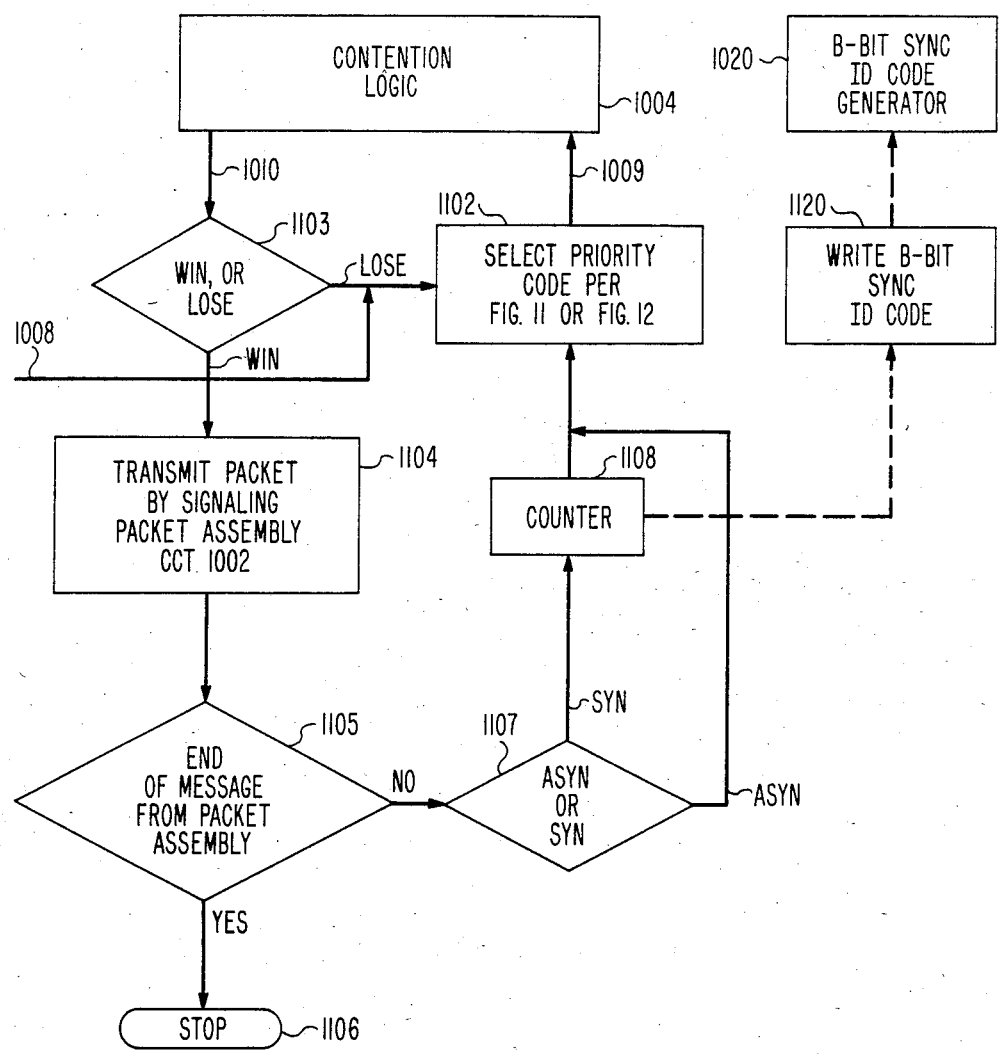
FIG. 11 illustrates a software implementation of the decision logic of FIG. 10.

The control process performed in decision logic 1003 is illustrated in FIG. 11. When packet assembly/disassembly circuit 1002 generates a packet ready indication on line 1008 indicating that the first packet in a message has been assembled and is ready for entry on bus 1006, an appropriate priority code is selected in step 1102. In accordance with the present invention, the particular priority code incorporated in the priority word depends upon (1) whether synchronous or asynchronous transmission is desired and (2) whether a time slot has already been captured. Logic diagrams illustrating the one and two-bit priority code contention protocols of the present invention, discussed previously, are shown in FIGS. 12 and 13 and are described below.

Once the appropriate priority code is determined, it is applied (via line 1009) to contention logic 1004, where the entire priority word is applied to the bus. Results of the contention are determined in contention logic 1004 (see FIG. 14), and the results extended to logic 1003 via line 1010 where the win or lose decision is used to determine (step 1103) the manner in which the priority code is subsequently formed.

If the contention was unsuccessful, a lose decision in decision step 1103 results in a repetition of priority code selection (step 1102) using the same priority code (except possibly for the least significant bit in the case where an asynchronous transmission is using the above-described group contention scheme). This loop is repeated as many times as necessary until contention is eventually won by BIU 1000. When contention is successful, the assembled packet is transmitted on the bus (step 1104) by extending a control signal from logic 1004 to packet assembly circuit 1002, and a test is next made (step 1105) to determine if the thus transmitted packet was the last packet in the message formed by DTE 1001. If an end-of-message signal is detected on line 1008, the decision logic 1003 terminates the process of FIG. 11 in step 1106. Otherwise, when additional packets are yet to be transmitted, information derived from packet assembly/disassembly circuit 1002 is used to make a decision (step 1107) as to whether the desired transmission is synchronous or asynchronous. For asynchronous transmission, the priority code used in succeeding attempts to gain bus access is determined by immediately repeating priority code selection step 1102. On the other hand, for synchronous transmission, a count is maintained (step 1108) of the position within each frame of the time slot captured by BIU 1000 during the successful contention. The appropriate priority code is also selected by repeating step 1102 but access is attempted only when the capatured slot designated in the stored count re-occurs in succeeding frames.

When the optional code generator 1020 is employed for subrate synchronous transmission, code generator 1020 is signalled in step 1120 at the beginning of the captured slot in each frame, at which time the code is transmitted into the first b bits of the slot. Recall that, although only one slot out of every n frames is required for the subrate transmission, the b-bit code is transmitted in every frame to indicate in the unused frames that the slot belongs to a particular rate class.

Figure 12:
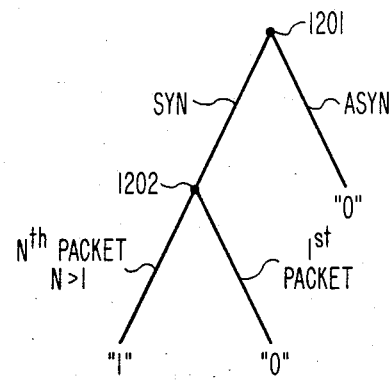
FIGS. 12 and 13 illustrate the manner in which one and two-bit priority codes are assigned in the priority code selection process illustrated in FIG. 11.
Figure 13:
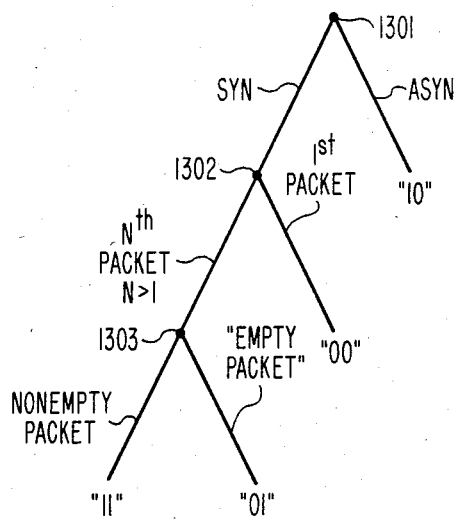

FIGS. 12 and 13 indicate, respectively, the decision process wherein one and two-bit priority codes are selected in selection step 1102 for incorporation in the priority words used by the bus contention protocol in the present invention. In FIG. 12, a decision tree beginning at node 1201 is illustrated; each node in the tree corresponds to a particular state of decision logic 1003 and indicates the priority code generated in that logic state. As shown, a decision is first made whether the desired transmission is synchronous or asynchronous. In the latter case, a 0 priority code is always assigned. For synchronous transmission, a further decision (node 1202) is made depending upon whether the packet is the first packet in a message, indicating an initial time slot contention or a subsequent packet, indicating an ongoing synchronous communication. If the packet is the first packet in a synchronous message, it is assigned a 0 priority code; succeeding packets in a synchronous message receive a priority code of 1.

In FIG. 13, the decision process for selection of a two-bit priority code, which begins at node 1301, is illustrated. If asynchronous transmission is desired, a priority code of 10 is included in the priority word assigned to each packet. For synchronous communication (node 1302), the priority code assigned to the first packet in a message is 00, while for ongoing synchronous communication, a further decision is made (node 1303) based on whether or not packet assembly/disassembly circuit 1002 has data from DTE 1001 ready to be inserted on bus 1006. If a packet does not exist and the captured time slot is thus available for use by other BIUs connected to the bus for asynchronous communication, a priority code of 01 is assigned. In this event, another DTE desiring asynchronous access will win the slot contention with a priority code of 10. Alternatively, for non-empty packets after the initial packet (where synchronous transmission is desired), a priority code of 11 is used. In the event that contention is won by a device that is using priority code 01 and has no information to place on the bus, the contention can be limited to only the priority code.

Figure 14:
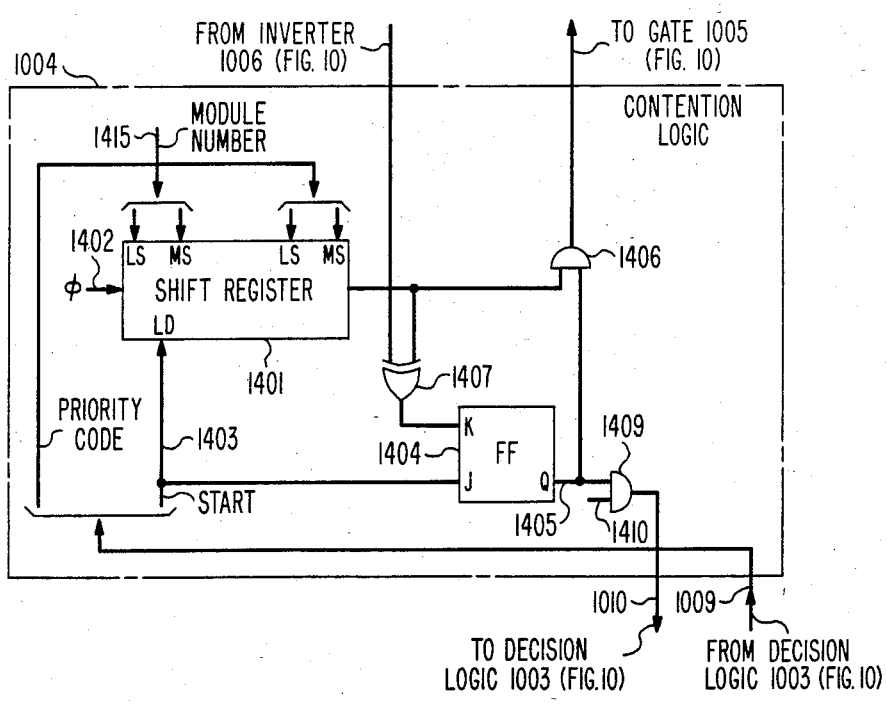
FIG. 14 is a block diagram of contention logic 1004 of FIG. 10.

One arrangement for contention logic 1004 of FIG. 10 is illustrated in block diagram form in FIG. 14. At the heart of the logic is a shift register 1401, which is arranged to receive the priority code generated in decision logic 1003 in FIG. 10. The priority word is entered in register 1401 at each occurrence of a high start signal on line 1403. (The priority code section of the priority word and the start signal 1403 are communicated to the contention logic by line 1009 in FIG. 10.) The module number portion of the priority word, which uniquely identifies the BIU, is locally generated from information preloaded and stored within the BIU, and entered into register 1401 via inputs from line 1415. Concurrently, the start signal is applied to the J input of J-K flip-flop 1404, causing its Q output on line 1405 to also be high.

During each contention cycle, the priority word in register 1401 is applied to bus 1006, one bit at a time (most significant bit first), under control of clock pulses applied to its write input line 1402. The output of register 1401 is applied to bus 1006 via AND gate 1406, which is enabled when the Q output of flip-flop 1404 is high. NOR gate 1005, shown in FIG. 10, is used so that data packets from assembly/disassembly circuit 1002 may be applied to bus 1006 at the appropriate times.

As each bit in the priority word is applied to bus 1006, the status of the bus is monitored by an exclusive OR gate 1407, which compares the bus status with the output of register 1401. If the priority bit output from register 1401 was a "1", and the bus status is also a "1", the output of exclusive OR gate 1407 remains low, maintaining the set Q status of flip-flop 1404 and continuing the contention. Similarly, if the transmitted and received priority bits are both "0", the output of gate 1407 is low, and contention continues. However, if the received status of the bus differs from the transmitted priority bits, the output of gate 1407 is high, resetting flip-flop 1404; AND gate 1406 is then blocked from inserting further bits in the priority word on bus 1006, and contention is terminated.

If all bits of the priority word stored in register 1401 have been read out and the output of flip flop 1404 on line 1405 is still high, AND gate 1409 is enabled to provide a high output on line 1010 when its CTIME input, line 1410, goes high. This output indicates that the bus interface unit has won the contention, and that the data portion of the packet may be applied to bus 1006 via OR gate 1005. If flip flop 1404 is reset at any time during contention, the output of gate 1409 remains low.

Figure 15:
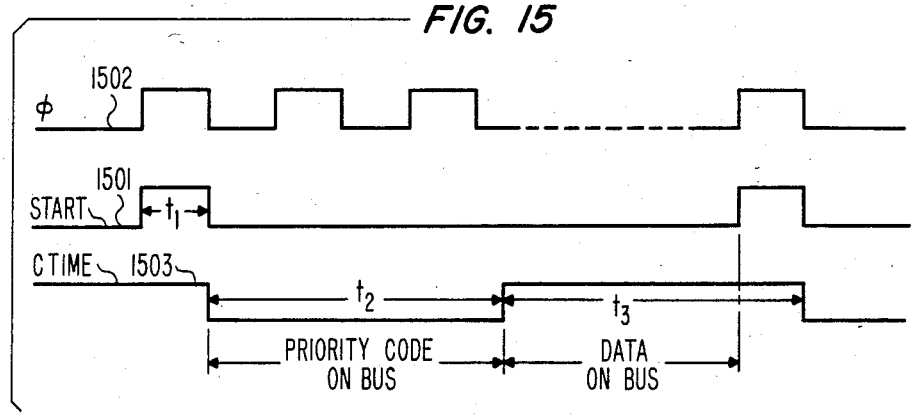
FIG. 15 is a timing diagram for the contention logic of FIG. 14.

The timing signals used in the contention logic of FIG. 14 are shown in FIG. 15. Start signal 1501, used to load register 1401, is high for a period $t_1$ at the beginning of each bus time slot. Clock pulses 1502 therafter cause the priority word in register 1401 to be read out, bit by bit. CTIME signal 1503 is high after time $t_2$ in which a sufficient number of clock pulses have occurred to complete the contention process; data in the packet may then be inserted on the bus for the remainder $t_3$ of the time slot interval.

When implementing the time-slotted bus 100 of FIG. 1 to enable synchronous communication, the transmit clock typically supplied by the different devices may not be synchronized with the bus clock. Therefore, it is usually necessary to provide a larger time slot on the bus (a few bits larger with reference to a bit-synchronized protocol) than what is normally required. The extra bits are used to provide elasticity in accommodating the different terminal clock rates. For example, if the bus is exactly 64 kb/s and BIU clock is 64.0001 kb/s, then occasionally it will be necessary for a time slot to handle one additional bit. With a bus rate slightly higher than 64 kb/s, the packet size which can be accommodated may vary slightly, while the time slot size remains fixed. In using this approach, it is necessary to distinguish information packet bits from "fill" bits in the appropriate time slot. Usually, a unary code word set 1, 01, 0001, . . . , may be used to distinguish the fill bits from the data bits. This fill capability may also be required when a synchronous device is communicating via a synchronous circuit with a higher frame rate.

In the block diagram of FIG. 1, separate data and contention busses 100 and 120 are shown for transporting information packets and contention information, respectively. FIGS. 10 and 14, on the other hand, illustrate a single bus 1006 adapted to carry both types of information. It will be understood by those skilled in the art that the present invention can work equally as well in both situations, and that suitable modifications will be necessary depending upon the selected arrangement. It should be noted that the particular contention mechanism described above in which each BIU applies a bit in its priority word to the bus and then compares that bit to the received bit (formed as the logical OR of all applied bits) requires that the end-to-end propagation delay along the bus be less than one bit interval. To allow higher speed data transmission and/or a longer bus with greater delay, use of a separate serial contention bus (as shown in FIG. 1) becomes desirable. In such an arrangement, a time offset can be introduced between contention and data bus access, such that contention for a particular time slot on the data bus occurs during the previous time slot on the contention bus. Since only the priority word and possibly the b-bit synchronous transmission rate identification code needs to be transmitted on the contention bus during a timeslot interval, the contention bus can operate at a much slower speed than the data bus. In some applications, the data bus can be a parallel structure, allowing transmission of, say an 8 or 16-bit word with each clock cycle, while the contention bus can be a simple serial structure.

Various modifications and adaptations to the present invention may be made by those skilled in the art without departing from the spirit and scope of the present invention. For that reason it is intended that the invention be limited only by the appended claims. For example, the unique module numbers associated with each BIU connected to the bus are normally fixed. However, these numbers can be varied according to a time dependent algorithm so as to achieve a round robin scheduling thereby avoiding the need for a group contention scheme of the type described above. By so doing the single priority bit used for group contention is eliminated but this gain is offset by added complexity needed to implement the time varying algorithm.

It is also to be noted that while the present invention is primarily intended for use with a distributed contention scheme in which each of the BIUs connected to the bus operate independently, it is possible to connect a "master" device to the bus whose function is to control access to the bus for maintenance and administration. This "master" device may access all of the time slots on the bus by contending with a higher priority code. This may be used, for example, to halt all communication on the bus, or to transmit control information to the BIUs. Moreover, the b identification bits transmitted in some or all of the time slots can be controlled by the master device in order to assure a desired mix of available synchronous transmission rates.

What is claimed is:

1. A technique for enabling a plurality of devices of initial and ongoing synchronous and asynchronous communication to gain access to time slots on a shared communication medium, each of said time slots occurring at a preselected frame rate, comprising:
    assigning priority information to each device, representing a priority level associated with that device, said priority information including variable information, granting access to a time slot by evaluating said priority information assigned to devices contending for that slot, wherein said assigning step is CHARACTERIZED BY forming said variable information as a function of (a) the synchronous or asynchronous nature of the communication desired by the device, and (b) the initial or ongoing status of said synchronous communication, wherein a higher one of said priority levels is assigned to ongoing synchronous communication and a lower one of said priority levels is assigned to initial synchronous communication, both as compared to the one of said priority levels assigned to asynchronous communication.

2. The technique defined in claim 1 CHARACTERIZED IN THAT said priority information assigning step includes prefixing a unique binary number associated with each of said devices with said variable information, and said access granting step includes evaluating said priority information on a bit by bit basis, most significant bit first.

3. The technique defined in claim 2 CHARACTERIZED IN THAT said variable information includes a two bit code assigned according to the following table:

|  | Code |
| --- | --- |
| Ongoing Synchronous Communication | 11 |
| Initial Synchronous Communication | 00 |
| Asynchronous Communication | 10 |

4. The technique defined in claim 3 wherein said assigning step is FURTHER CHARACTERIZED BY assigning a code "01" during selected time slots accessed by one of said devices engaged in ongoing synchronous communication, whereby said selected time slots may be relinquished to another of said devices for asynchronous communication.

5. The invention defined in claim 3 CHARACTERIZED IN THAT ones of said devices engage in ongoing synchronous communication at a rate less than said frame rate, said variable information further includes a b-bit prefix indicating said lesser rate, and said access granting step further includes comparing said b-bit prefix for a device having synchronous access with said b-bit prefix for devices seeking synchronous access.

6. A method of resolving contention among a plurality of devices connected to a shared communication medium for access to time slots in a sequence of frames including the steps of:

assigning a unique priority word to each device contending for access to any time slot, and granting access to a time slot to one of said contending devices by comparing the values of said priority words assigned to each of said contending devices, CHARACTERIZED IN THAT said priority word assigning steps includes:

(1) assigning a low value priority word to a device initially contending for access to said medium for synchronous communication, and (2) assigning a high value priority word to a device seeking synchronous communication which has already gained access to a particular time slot, said high value priority word assuring said device access to said medium during subsequent occurrences of said time slot in succeeding frames.

7. The method defined in claim 6 wherein said priority word includes a fixed portion uniquely identifying each of said devices and a priority code prefix.

8. The method defined in claim 7 wherein said assigning step includes selecting said priority code as a "0" for said low value and as a "1" for said high value.

9. The method defined in claim 7 wherein said assigning step further includes selecting said priority code as "00" for said low value and as "11" for said high value.

10. The method defined in claim 9 wherein at least one of said devices contending for access to said medium for asynchronous communication is assigned a priority code of "10" between said high value and said low value.

11. The method defined in claim 10 wherein said assigning step further includes selecting said priority code as "01" during time slots relinquished by devices engaged in ongoing synchronous communication for use in asynchronous communication.

12. The method defined in claim 7 wherein said access granting step includes:

comparing the values of said priority words on a bit by bit basis, most significant bit first, and selectively suppressing the comparison of at least one of the bits of said priority words.

13. The method defined in claim 12 wherein said suppression is selected as a function of the synchronous or asynchronous nature of the communication desired by said devices.

14. A technique for enabling one of a plurality of devices contending for access to time slots on a shared communication medium to gain access to said medium for asynchronous or synchronous communication, synchronous communication requiring access to at least one particular time slot in each of a sequence of frames each of which includes an integral number of time slots, including the steps of:

assigning a uniquely valved priority word to each device contending for access to one of said time slots, and granting access to a time slot to one of said contending devices by comparing, most significant bit first, the values of said assigned priority words, CHARACTERIZED IN THAT said priority word assigning step includes:

selecting said priority word as a joint function of (1) whether a device is contending for synchronous or asynchronous access, and (2) whether a device contending for synchronous access is initially contending for a time slot or has already accessed a particular time slot.

15. The technique defined in claim 14 wherein said assigning step is further characterized by forming said priority word by prefixing a binary number uniquely identifying each of said devices with a priority code containing at least one bit.

16. The technique defined in claim 15 wherein said assigning step includes selecting a one bit priority code according to the following table:

| Contention For: | Priority Code |
|---|---|
| Asynchronous or initial synchronous access | 0 |
| Continued synchronous access | 1 |

17. The technique defined in claim 15 wherein said assigning step includes forming a three bit priority code according to the following table:

| Contention For: | Priority Code |
|---|---|
| Continued synchronous access | 111 |
| Asynchronous access | 110 to 010 |
| Initial synchronous access | 000 |

18. The technique defined in claim 14 wherein said assigning step includes forming a two bit priority code according to the following table:

| Contention For: | Priority Code |
|---|---|
| Continued synchronous access | 11 |
| Asynchronous Access | 10 |
| Initial synchronous access | 00 |

19. The technique defined in claim 18 wherein said assigning step includes changing said priority code from 11 to 01 when a device which already has access to a particular time slot relinquishes said slot to another device seeking asynchronous access.

20. An apparatus for enabling a plurality of devices capable of initial and ongoing synchronous and asynchronous communication to gain access to time slots on a shared communication medium, each of said time slots occurring at a preselected frame rate, comprising:
means for assigning priority information to each device, said information including variable information,
means for granting access to a time slot by evaluating the priority information assigned to devices contending for that slot,
characterized in that said assigning means includes means for forming said variable information as a function of (a) the synchronous or asynchronous nature of the communication desired by the device, and (b) the initial or ongoing status of said synchronous communication, and
for assigning higher priority to ongoing synchronous communication and lower priority to initial synchronous communication, both as compared to the priority assigned to asynchronous communication.

21. The apparatus defined in claim 20 characterized in that said priority assigning means is arranged to prefix a unique binary number associated with each of said devices with said variable information, and
said access granting means is arranged to evaluate said priority information on a bit by bit basis, most significant bit first.

22. The apparatus defined in claim 21 characterized in that said variable information formed in said priority assigning means includes a two bit code assigned according to the following relationship:

| | Code |
|---|---|
| Ongoing Synchronous Communication | 11 |
| Initial Synchronous Communication | 00 |
| Asynchronous Communication | 10 |

23. The apparatus defined in claim 22 further characterized in that said assigning means is arranged to assign a code "01" during selected time slots accessed by one of said devices engaged in ongoing synchronous communication, whereby said selected time slots may be relinquished to another of said devices for asynchronous communication.

24. The invention defined in claim 20 characterized in that ones of said devices engage in ongoing synchronous communication at a rate less than said frame rate, said variable information further includes a b-bit prefix indicating said lesser rate, and said access granting means is further arranged to compare said b-bit prefix for a device having synchronous access with said b-bit prefix for devices seeking synchronous access.

25. Apparatus for resolving contention among a plurality of devices connected to a shared communication medium for access to time slots in a sequence of frames including:
means for assigning a uniquely valued priority word to each device contending for access to any time slot, and
means for granting access to a time slot to one of said contending devices by comparing the values of said priority words assigned to each of said contending devices,
characterized in that said priority word assigning means is arranged to:
(1) assign a low value priority word to a device initially contending for access to said medium for synchronous communication, and
(2) assign a high value priority word to a device seeking synchronous communication which has already gained access to a particular time slot, said high value priority word assuring said device access to said medium during subsequent occurrences of said time slot in succeeding frames.

26. The invention defined in claim 25 wherein said priority word includes a fixed portion uniquely identifying each of said devices and a priority code prefix.

27. The invention defined in claim 21 wherein said assigning means is arranged to select said priority code as a "0" for said low value and as a "1" for said high value.

28. The invention defined in claim 26 wherein said assigning means is arranged to select said priority code as "00" for said low value and as "11" for said high value, and select said priority code as 10 for devices seeking asynchronous communication.

29. The invention defined in claim 28 wherein said assigning means is further arranged to select said priority code as 01 during time slots relinquished by devices engaged in ongoing synchronous communication for use in asynchronous communication.

30. Apparatus for enabling one of a plurality of devices contending for access to time slots on a shared communication medium to gain access to said medium for asynchronous or synchronous communication, synchronous communication requiring access to at least one particular time slot in each of a sequence of frames each of which include an integral number of time slots, including:
- means for assigning a uniquely valued priority word to each device contending for access to one of said time slots, and
- means for granting access to a time slot to one of said contending devices by comparing, most significant bit first, the values of said assigned priority words, characterized in that said priority word assigning means is arranged to:
- select said priority word as a joint function of
  (1) whether a device is contending for synchronous or asynchronous access, and
  (2) whether a device contending for synchronous access is initially contending for a time slot or has already accessed a particular time slot.

31. The apparatus defined in claim 30 wherein said assigning means is arranged to
form said priority word by prefixing a binary number uniquely identifying each of said devices with a priority code containing at least one bit.

32. The apparatus defined in claim 31 wherein said assigning means is arranged to form a one bit priority code according to the following table:

| Contention For: | Priority Code |
| --- | --- |
| Asynchronous or initial synchronous access | 0 |
| Continued synchronous access | 1 |

33. The apparatus defined in claim 31 wherein said assigning means is arranged to form a two bit priority code according to the following table:

| Contention For: | Priority Code |
| --- | --- |
| Continued synchronous access | 11 |
| Asynchronous Access | 10 |
| Initial synchronous access | 00 |

34. The apparatus defined in claim 33 wherein said assigning means is arranged to change said priority code from 11 to 01 when a device which already access a particular time slot relinquishes said slot to another device seeking asynchronous access.

35. The apparatus defined in claim 31 wherein said assigning means is arranged to form a three bit priority code according to the following table:

| Contention For: | Priority Code |
| --- | --- |
| Continued synchronous access | 111 |
| Asynchronous access | 110 to 010 |
| Initial synchronous access | 000 |

* * * * *

UNITED STATES PATENT AND TRADEMARK OFFICE
CERTIFICATE OF CORRECTION

PATENT NO. : 4,593,282

DATED : June 3, 1986

INVENTOR(S) : Anthony Acampora, Michael J. Hluchyj, Chan D. Tsao

Page 1 of 2

It is certified that error appears in the above-identified patent and that said Letters Patent is hereby corrected as shown below:

On the title page

Inventor, "Michael G. Hluchjy" should read --Michael G. Hluchyj--.

Column 5, line 67 "ino" should read --into--.

Column 7, line 36 "prioriy" should real --priority--.

Column 7, line 37 "worrds" should read --words--.

Column 7, line 57 "it" should read --its--.

Column 8, line 59 "protocal" should read --protocol--.

Column 14, line 5 "capatured" should read --captured--.

Column 15, line 41 "therafter" should read --thereafter--.

Column 16, line 63 "devices of initial" should read --devices capable of initial--.

UNITED STATES PATENT AND TRADEMARK OFFICE
CERTIFICATE OF CORRECTION

PATENT NO. : 4,593,282

DATED : June 3, 1986

INVENTOR(S) : Anthony Acampora, Michael J. Hluchyj, Chan D. Tsao

Page 2 of 2

It is certified that error appears in the above-identified patent and that said Letters Patent is hereby corrected as shown below:

Column 18, line 46, "valved" should read --valued--.

Signed and Sealed this

Fifth Day of December, 1989

Attest:

JEFFREY M. SAMUELS

Attesting Officer     Acting Commissioner of Patents and Trademarks